United States Patent
Inou et al.

(10) Patent No.: US 10,632,997 B2
(45) Date of Patent: Apr. 28, 2020

(54) VEHICLE CONTROL DEVICE

(71) Applicant: DENSO CORPORATION, Kariya, Aichi-pref. (JP)

(72) Inventors: Hiroshi Inou, Kariya (JP); Minoru Okada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 30 days.

(21) Appl. No.: 15/780,558

(22) PCT Filed: Dec. 1, 2016

(86) PCT No.: PCT/JP2016/085759
§ 371 (c)(1),
(2) Date: May 31, 2018

(87) PCT Pub. No.: WO2017/094849
PCT Pub. Date: Jun. 8, 2017

(65) Prior Publication Data
US 2018/0354518 A1   Dec. 13, 2018

(30) Foreign Application Priority Data
Dec. 4, 2015   (JP) .................. 2015-237547

(51) Int. Cl.
*G08G 1/16*   (2006.01)
*B60W 30/18*   (2012.01)
*G05D 1/02*   (2020.01)

(52) U.S. Cl.
CPC ..... *B60W 30/18163* (2013.01); *G05D 1/0214* (2013.01); *G08G 1/163* (2013.01); *G08G 1/167* (2013.01); *B60W 2550/306* (2013.01); *B60W 2550/308* (2013.01); *G05D 2201/0213* (2013.01)

(58) Field of Classification Search
CPC ..... B60W 30/18163; B60W 2550/306; B60W 2550/308; G05D 1/0214; G05D 2201/0213; G08G 1/163; G08G 1/167
USPC .......................................................... 701/23
See application file for complete search history.

(56) References Cited

U.S. PATENT DOCUMENTS

| | | | |
|---|---|---|---|
| 2007/0080968 A1* | 4/2007 | Kogure | B60W 30/09 345/474 |
| 2009/0088925 A1 | 4/2009 | Sugawara et al. | |
| 2010/0049375 A1* | 2/2010 | Tanimoto | B60T 7/12 701/1 |

FOREIGN PATENT DOCUMENTS

| | | |
|---|---|---|
| JP | H10-153039 | 6/1998 |
| JP | 2969175 | 11/1999 |
| JP | 2969175 B1 | 11/1999 |
| JP | 2006-076568 A | 3/2006 |
| JP | 2009-230377 A | 10/2009 |

(Continued)

*Primary Examiner* — Gertrude Arthur Jeanglaude
(74) *Attorney, Agent, or Firm* — Knobbe, Martens, Olson & Bear, LLP (57) ABSTRACT

In a vehicle control device, a target motion estimation unit estimates a motion for a target area representing an area where no other vehicle is traveling on a lane in the future based on motions of other vehicles traveling on the lane to which a course is to be changed. A control amount setting unit sets a control amount of an own vehicle required in order to make the motion of the target area and a motion of the own vehicle match. A motion control unit controls the motion of the own vehicle according to the set control amount.

16 Claims, 10 Drawing Sheets

(56) References Cited

FOREIGN PATENT DOCUMENTS

| JP | 2012-123606 A | 6/2012 |
| JP | 2012-234292 A | 11/2012 |
| JP | 2014-019332 A | 2/2014 |

* cited by examiner

[CASE WHERE ALL OTHER VEHICLES CAN BE SENSED]

FIG.8B

[CASE WHERE ANOTHER VEHICLE COMES TO SIDE OF OWN VEHICLE FROM OUTSIDE SENSOR RANGE: WITH RELATIVE SPEED]

FIG.8C

[CASE WHERE ANOTHER VEHICLE COMES TO SIDE OF OWN VEHICLE FROM OUTSIDE SENSOR RANGE: NO RELATIVE SPEED]

FIG.10

VEHICLE CONTROL DEVICE

CROSS REFERENCE TO RELATED APPLICATION

This application is the U.S. national phase of International Application No. PCT/JP2016/085759, filed on Dec. 1, 2016, which designated the U.S. and claims priority to Japanese Patent Application No. 2015-237547, filed on Dec. 4, 2015, the entire contents of which are incorporated herein by reference.

TECHNICAL FIELD

The present disclosure relates to a vehicle control device for controlling motions of an own vehicle.

BACKGROUND ART

A known device of the vehicle control device as described above predicts surrounding traffic flows when the own vehicle is to merge into a main lane (see PTL 1, for example).

CITATION LIST

Patent Literature

[PTL 1] JP 2969175 B

SUMMARY OF THE INVENTION

As a result of detailed examination by the inventor, it has been found that the above-mentioned vehicle control device has a problem regarding how the own vehicle is moved to the lane to which the course is changed after predicting the traffic flows, and appropriate control cannot be always ensured.

In one aspect of the present disclosure, it is desirable to enable a vehicle control device that controls the movement of the own vehicle to appropriately perform control for moving the own vehicle to the course change destination.

In a vehicle control device according to an aspect of the present disclosure, a target motion estimation unit is configured to search a target area representing an area where no other vehicle is traveling on a lane in the future based on motions of another vehicle traveling on the lane to which a course is to be changed and estimates motions in the target area. A control amount setting unit is configured to set a controlled variable of the own vehicle, required to make the motion of the target area and the motion of the own vehicle match, as a target control amount for merging to the target area. A motion control unit controls the motion of the own vehicle according to the set target control amount.

According to such a vehicle control device, the motion of the target area where no other vehicle exists is estimated and the own vehicle is merged into the target area. That is, since the own vehicle is controlled so that the motion of the own vehicle matches with the motion of the target area, it is possible to appropriately carry out the control for moving the own vehicle to the course to which its course is to be changed.

The configuration of the present disclosure can be combined in any way as far as the combination is possible. A part of the configuration may be omitted from the combination.

DESCRIPTION OF THE EMBODIMENTS

An embodiment according to the present disclosure will be described below with reference to the drawings.

[Configuration of the Present Embodiment]

A vehicle control system 1 to which the present disclosure is applied is mounted on a vehicle such as a passenger car (hereinafter referred to as an own vehicle).

The vehicle control system 1 has a function of controlling motion of the own vehicle, and particularly, is configured to control the own vehicle safely without impairing comfort when the own vehicle changes lanes (performs lane changing) and moves into a lane to which the course is changed, for example, upon merging or lane changing.

Figure 1:
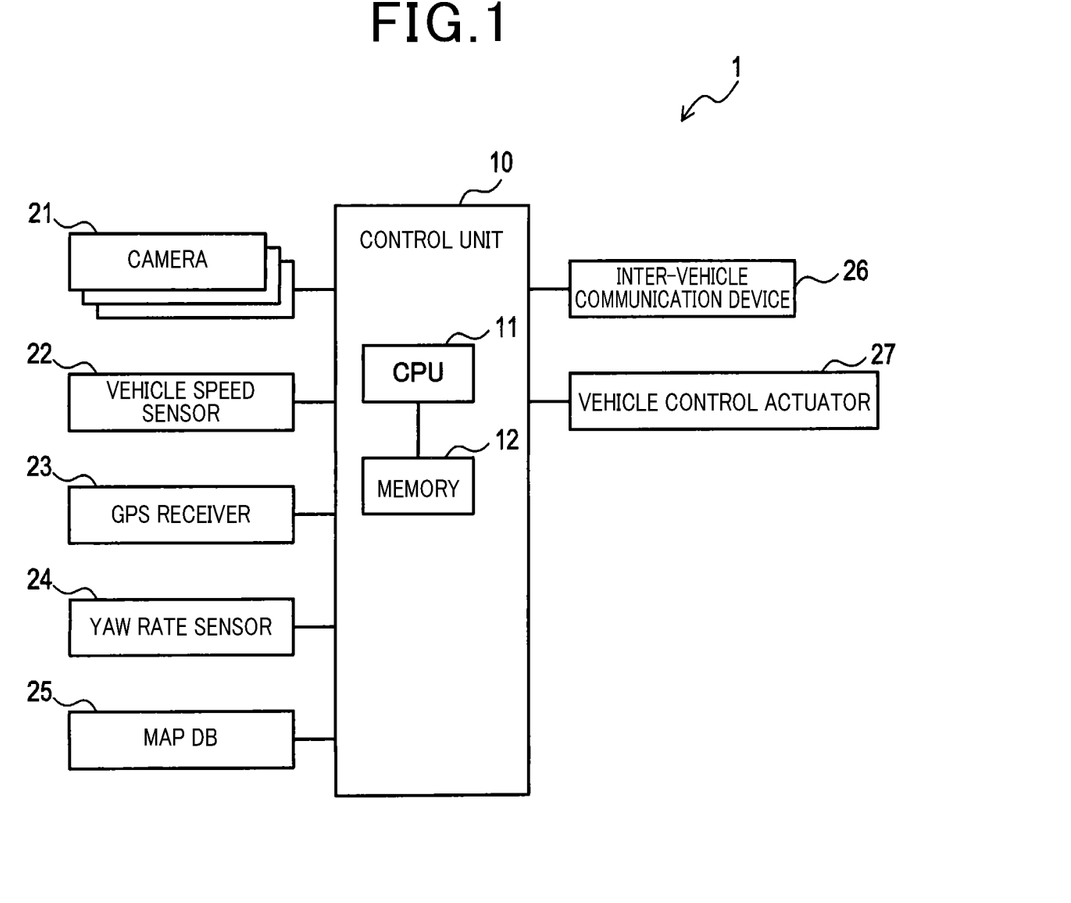
FIG. 1 A block diagram showing a general configuration of a vehicle control system to which the present disclosure is applied.

As shown in FIG. 1, the vehicle control system 1 includes a control unit 10, a camera unit 21, a vehicle speed sensor 22, a GPS (Global Positioning System) receiver 23, a yaw rate sensor 24, a map database (DB) 25, an inter-vehicle communication device 26, and a vehicle control actuator 27.

The camera unit 21 is configured as a well-known camera system that captures images of the surroundings of the own vehicle using a plurality of cameras. The camera unit 21 transmits the captured images obtained from the cameras to the control unit 10. The camera unit 21 is used to recognize positions and speed of other vehicles around the own vehicle by way of image processing.

The vehicle speed sensor 22 is configured as a well-known vehicle speed sensor for detecting the traveling speed of the own vehicle. The vehicle speed sensor 22 sends the detected vehicle speed to the control unit 10.

The GPS receiver 23 is configured as a well-known GPS receiver that recognizes the position of the own vehicle by receiving radio waves transmitted from a plurality of GPS satellites. The GPS receiver 23 sends information on the latitude and longitude of the subject vehicle to the control unit 10.

The yaw rate sensor 24 is configured as a well-known yaw rate sensor for detecting an angular turn rate of the own vehicle. The yaw rate sensor 24 sends the detected yaw rate to the control unit 10.

The inter-vehicle communication device 26 performs communication for exchanging position information with other vehicles positioned within the communicable range. In other words, the inter-vehicle communication device 26 sends the position information of the own vehicle to other vehicles and receives information including information for identifying the other vehicles (identification information such as ID) and the other vehicles' position information from the other vehicles. The inter-vehicle communication device 26 sends the obtained information to the control unit 10.

The map DB 25 is configured as a well-known database that stores map information associated with latitudes and longitudes. In the map DB 25, information of the positions where the own vehicle is required to change lanes, such as the positions of merging areas and the positions of areas which are not merging areas but the number of lanes decreases, is stored as the map information.

A merging area indicates an area where a plurality of roads are connected to become one road, and a vehicle can change its lane when a lane disappears from the one that disappears to another. The merging area is specified by the start point and the end point of this area (see FIG. 3).

From the map DB 25, map information indicating the surroundings of the own vehicle is mainly read out in response to a request from the control unit 10.

The vehicle control actuator 27 represents an actuator that is required when performing automatic driving of the own vehicle. For example, the vehicle control actuator 27 includes an actuator for controlling an accelerator opening angle and a brake hydraulic pressure of the own vehicle, an actuator for controlling a steering state, and the like.

The control unit 10 is configured as a computer including a CPU 11 and a memory 12 such as ROM and RAM. The CPU 11 performs various processes such as a merging support process described later based on the programs stored in the memory 12.

The various processes include a process of automatically driving the own vehicle.

When the own vehicle is to be automatically driven, the map information to the destination is obtained from the map DB 25 and a route to the destination is set. Then, based on the images captured by the camera unit 21 and the map information, a control pattern conforming to the actual road situation is generated, and instructions are sent to the vehicle control actuator 27 according to this control pattern, so that the own vehicle can reach the destination.

The control pattern indicates a map in which time is associated with values of a control amount (acceleration in the example shown in FIGS. 9 and 10) of the own vehicle at a certain time. That is, it is possible to recognize the appropriate output of the control amount by only specifying the current or future time and referring to the control pattern. A control amount is a parameter related to motion required to control the motion of the own vehicle. For example, the control amounts may include speed, acceleration, turning angle speed, actuation amount of the actuator for changing these, and so on.

[Processes of the Present Embodiment]

Figure 2:
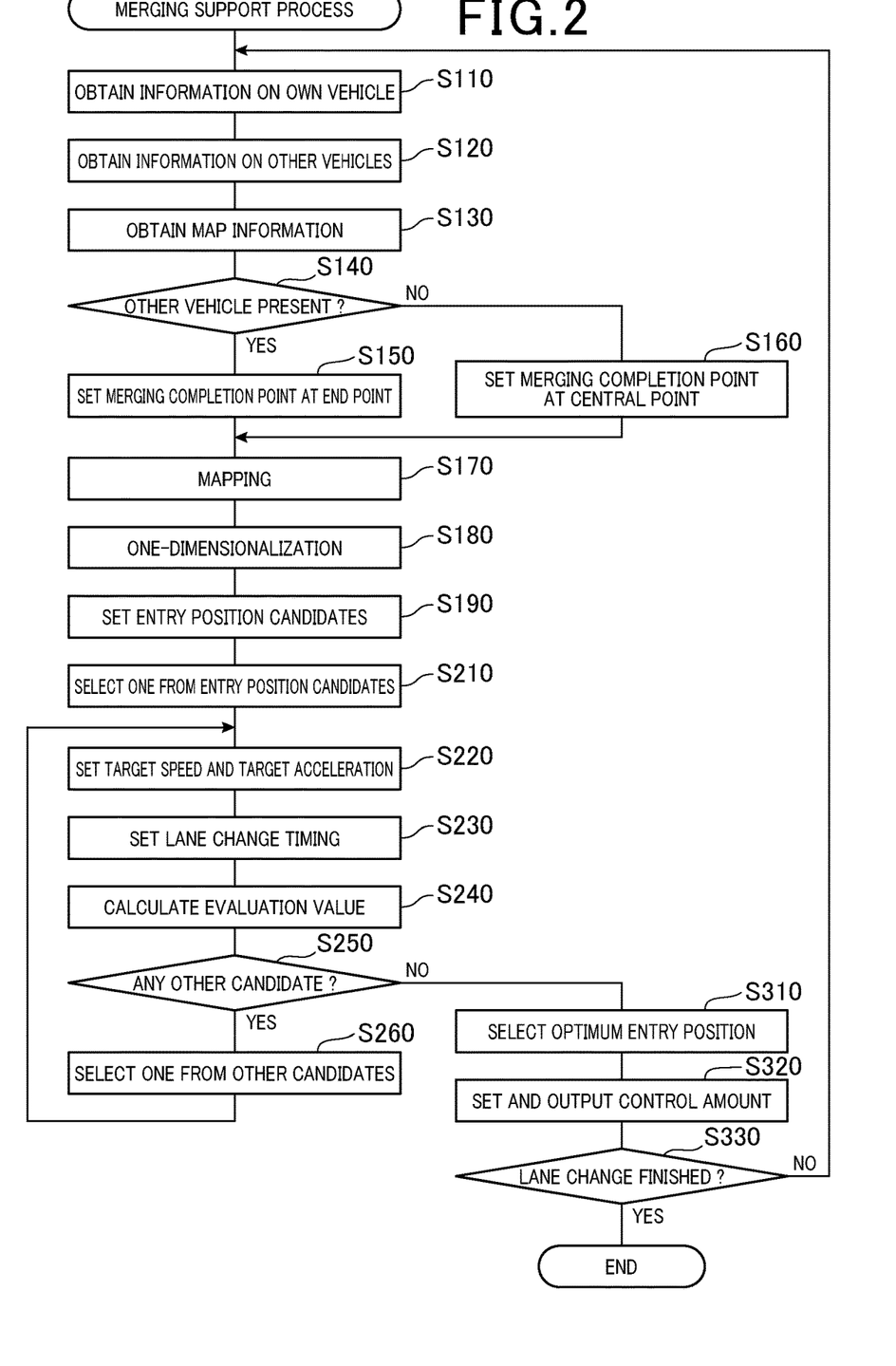
FIG. 2 A flowchart showing a merging support process performed by a control unit.

In the vehicle control system 1 configured as described above, the control unit 10 performs the merging support process shown in FIG. 2. The merging support process is a control performed when the road on which the own vehicle is traveling is connected with another road and becomes one, causing the own vehicle to change its traveling lane to another lane when the lane on which the own vehicle is traveling disappears.

For example, the merging support process is started when the control unit 10 is performing automatic driving of the own vehicle, and a merging area exists within a certain distance range from the own vehicle set in advance (a distance sufficient for acceleration, for example, 500 m or more).

In the merging support process, first, information on the own vehicle is obtained (S110). In this process, the traveling speed of the own vehicle is obtained from the vehicle speed sensor 22, and the turning angle speed of the own vehicle is obtained from the yaw rate sensor 24. Further, the position of the own vehicle is obtained from the GPS receiver 23.

Then, information on other vehicles is obtained (S120). In this process, positions of the other vehicles are estimated from the captured images obtained by the camera unit 21. In addition, the positions of the other vehicles are obtained from the inter-vehicle communication device 26. Based on these positions and the positions of the other vehicles obtained last time, the traveling speed of the other vehicles are calculated.

Next, the map information is obtained (S130). The map information obtained here includes shapes of the roads to the merging areas around the own vehicle (within the distance range described above) and the positions of the start points and the end points of the merging areas. The shape of a road includes information such as the curvature of the lane on which the own vehicle is traveling, the lane width, and the like.

Next, the presence or absence of other vehicles traveling on the lane to which the course is to be changed (lane after lane change) is determined (S140).

In this process, if other vehicles are detected on the lane after the lane change based on the captured images from the camera unit 21 and the information from the inter-vehicle communication device 26, it is determined that there are other vehicles, and if no other vehicle is detected based on such information, it is determined that there is no other vehicle.

Figure 3:
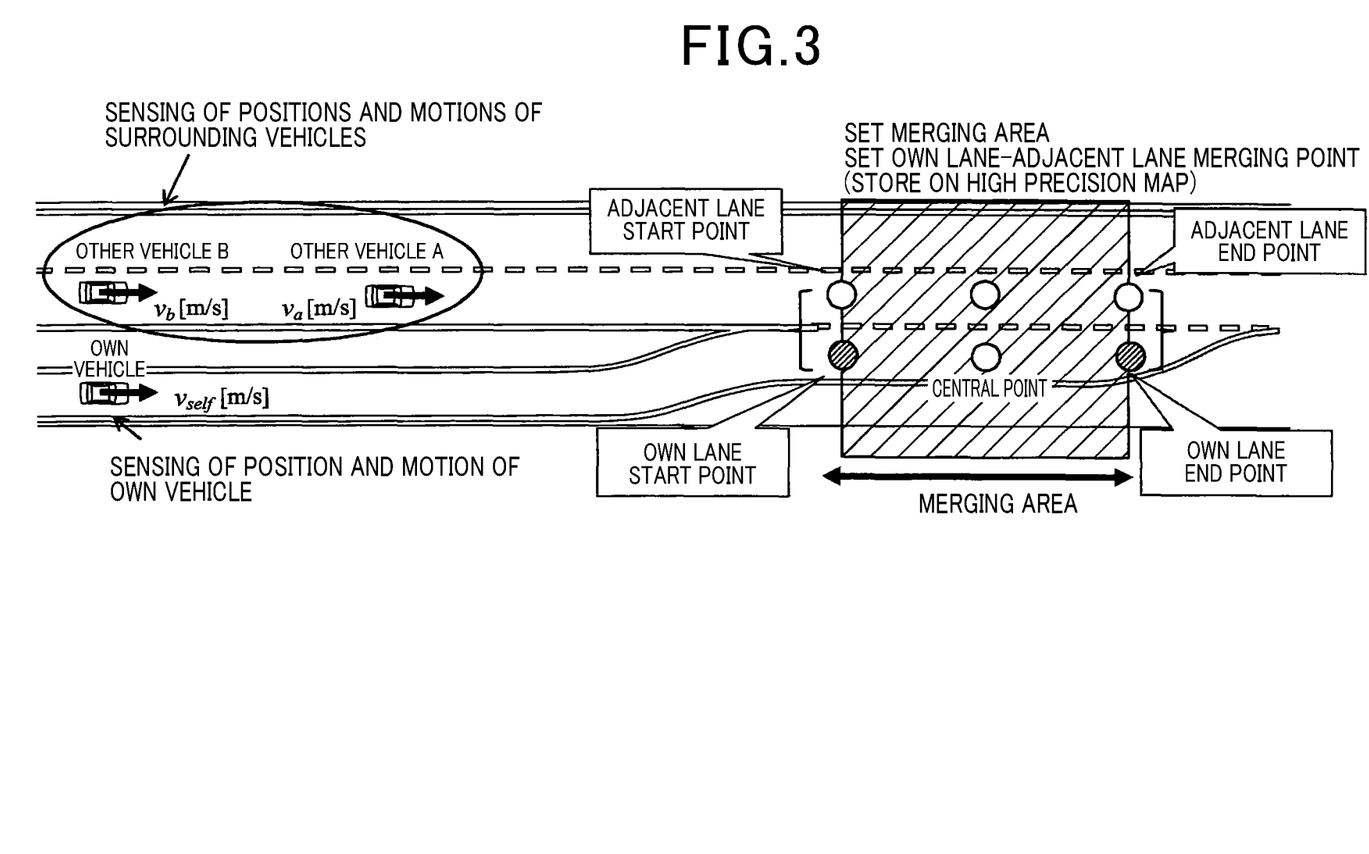
FIG. 3 A plan view showing an example of a merging area.

If there is another vehicle (S140: YES), a merging completion point is set as the end point. That is, it is set so that the merging is completed when the vehicle reaches the end point. If there is no other vehicle (S140: NO), the merging completion point is set as a central point (S160). The central point indicates an intermediate (central) point between the start point and the end point as shown in FIG. 3. When there is no other vehicle, it means that the lane change is completed earlier than when there is another vehicle.

Figure 4:
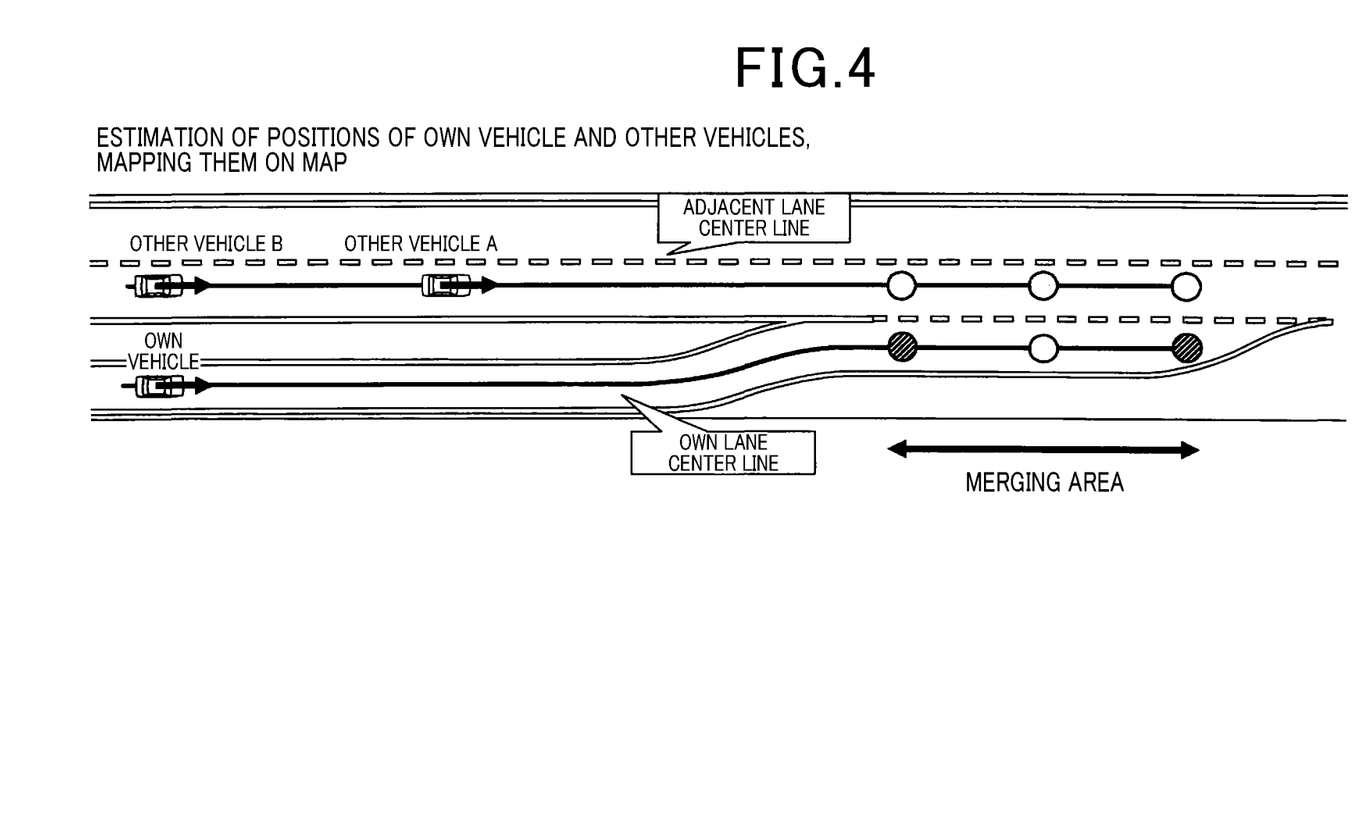
FIG. 4 A plan view showing a process of mapping positions of an own vehicle and other vehicles onto a map.

Next, mapping is performed to virtually place the positions of the own vehicle and the other vehicles on the map (S170). In this process, as shown in FIG. 4, the own vehicle and the other vehicles are virtually positioned on the map data of the surroundings of the own vehicle according to the positions of the own vehicle and the other vehicles.

Figure 5:
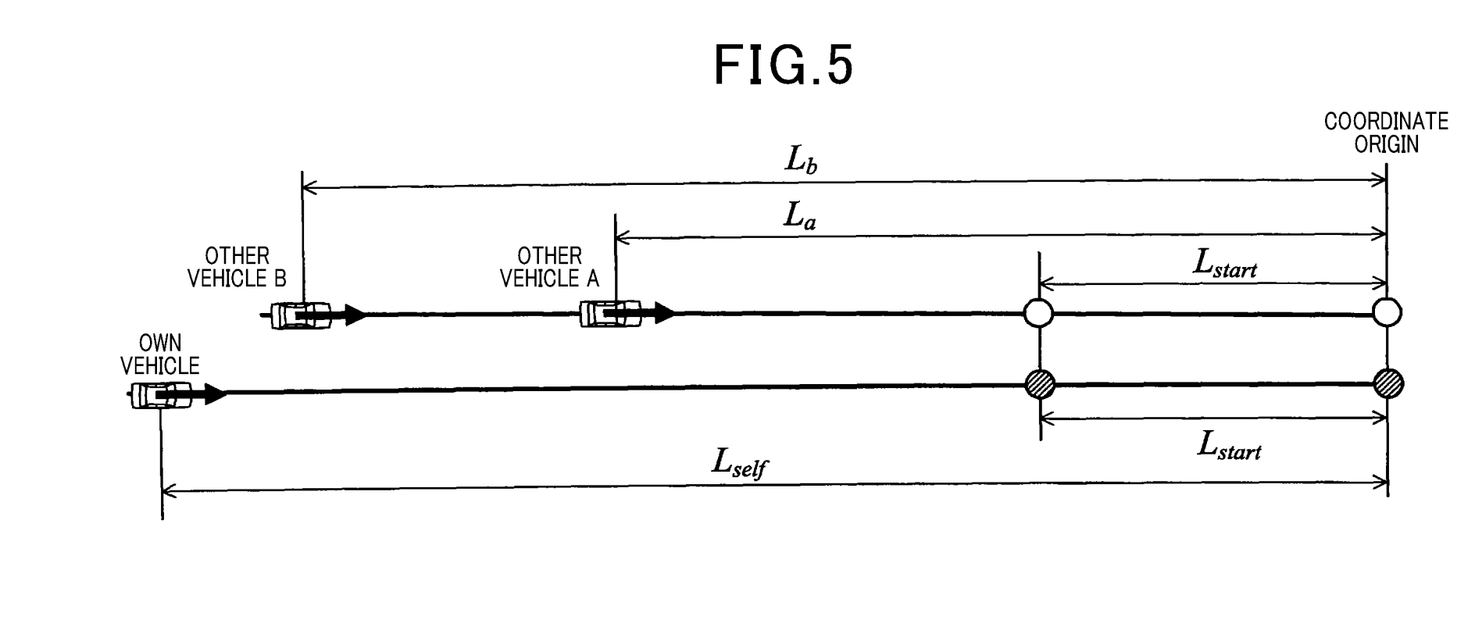
FIG. 5 A plan view showing an example where routes from the own vehicle and other vehicles to the merging area are one-dimensionalized shown in schematic form.

Next, one-dimensionalization is performed (S180). One-dimensionalization represents, regardless of whether the road shape is a straight line or a curved line, the road shape as a straight line. That is, as shown in FIG. 5, the own vehicle and other vehicles are treated as traveling to the merging area on a one-dimensional graph extending in the front-rear direction of the own vehicle.

Figure 6:
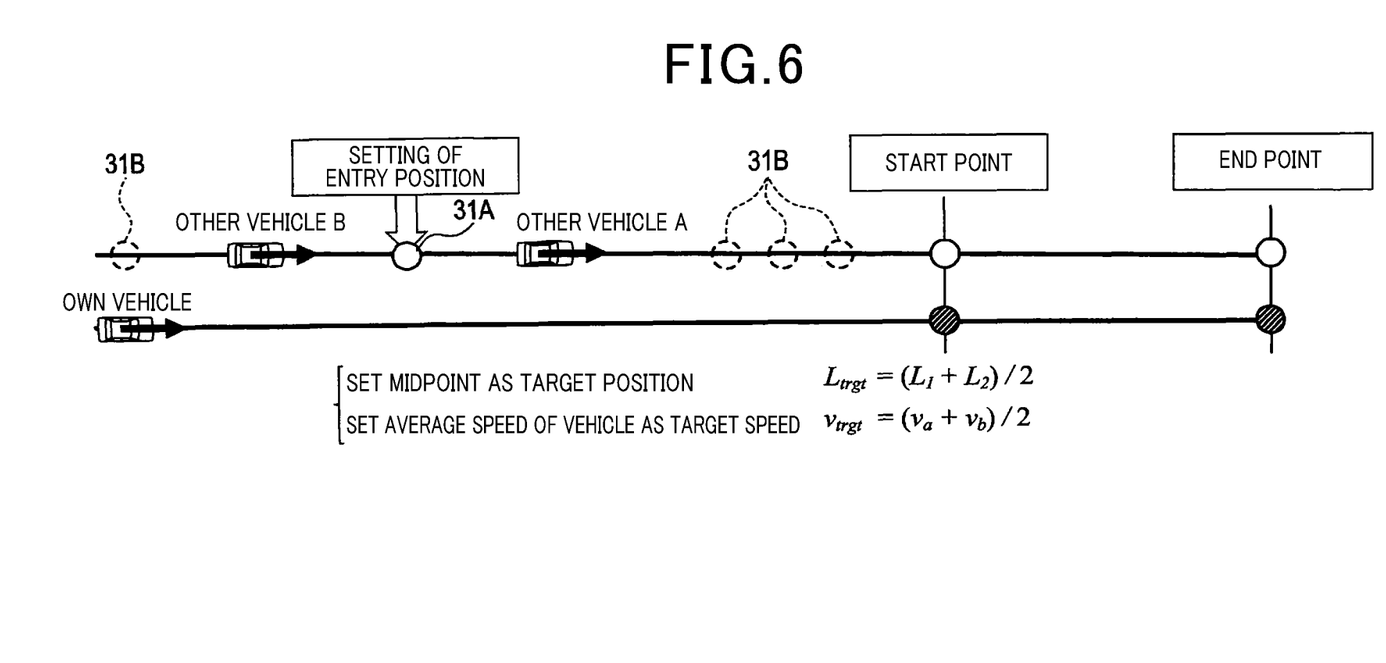
FIG. 6 A plan view showing a setting of entry position candidates.

Next, entry position candidates 31A and 31B are set (S190). The entry position candidates 31A and 31B are set to positions that are relatively safe considering the position of the other vehicle on the lane to which the course is changed. For example, as shown in FIG. 6, the entry position candidate may be set at the center of two other vehicles or at a position at a safe distance (for example, about 40 m) from the other vehicle. Further, when the process of S190 is repeatedly executed while the own vehicle and the other vehicles are travelling, the entry position candidate moves along with the movement of the own vehicle and the other vehicles.

Note that when there are many positions at safe distances from other vehicles, the entry position candidates 31B are set at every predetermined distance (for example, every 10 m). Further, the moving speed of the entry position candidates 31A and 31B is obtained when the entry position candidates 31A and 31B move.

When the candidates 31A and 31B are set at the center of two other vehicles, the moving speed of the entry position candidates 31A and 31B is the average value of the traveling speeds of these two other vehicles, and when it is set in front of or behind one of the other vehicles, it is the traveling speed of this other vehicle. When there is no other vehicle, the moving speed of the entry position candidate is set to an arbitrary speed such as the speed limit of the road to which the vehicle is merging.

Next, a process of selecting an optimum entry position from a plurality of entry position candidates 31A and 31B is performed (S210 to S310). First, one of the entry position candidates 31A and 31B is selected (S210).

Figure 7:
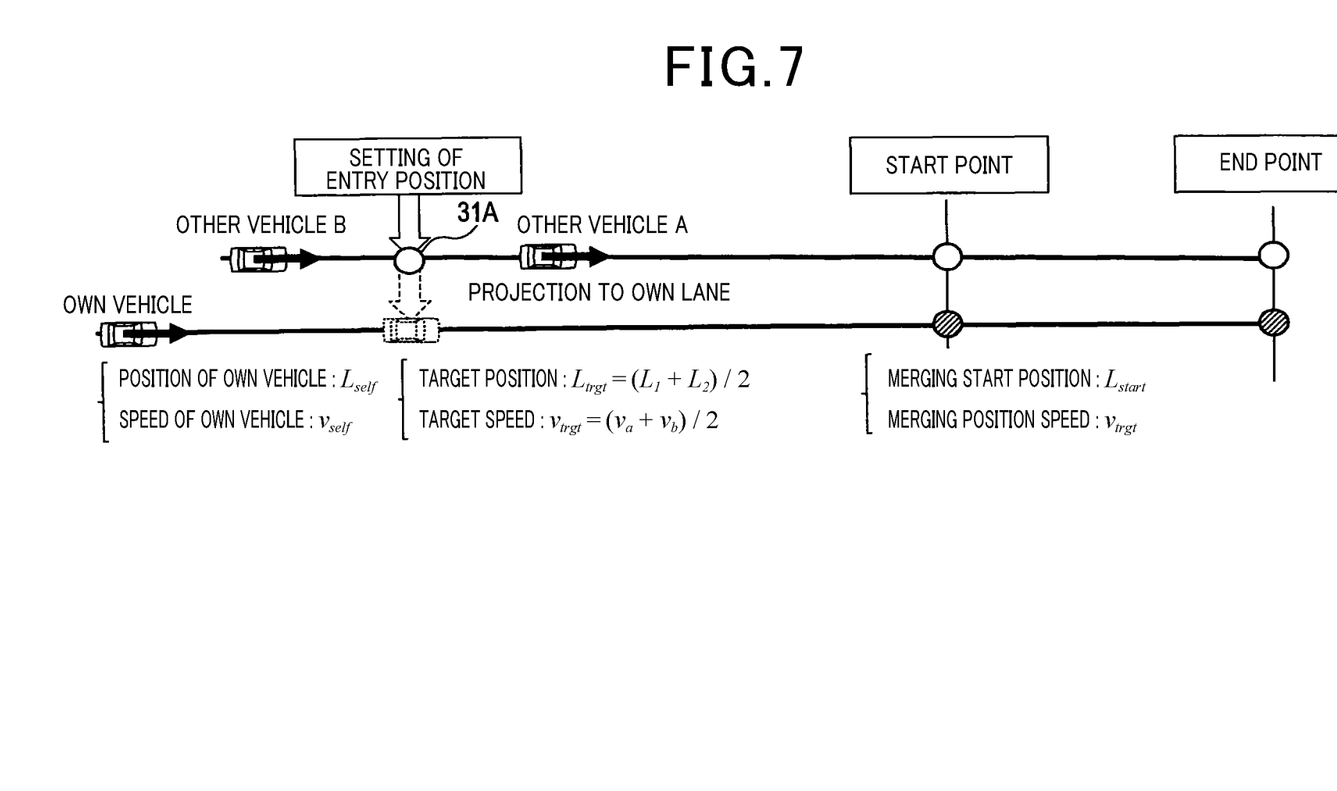
FIG. 7 A plan view showing an example of a procedure for setting a target speed and a target acceleration.

Then, a target speed and a target acceleration are set (S220). In this process, as shown in FIG. 7, the selected entry position candidate 31A, 31B is projected onto the lane on which the own vehicle travels, and the target speed and the target acceleration are set so that the movement of the selected entry position candidate 31A, 31B matches with the movement of the own vehicle. The target acceleration αxref in the front-rear direction can be obtained by the following equation when the traveling speed of the own vehicle is set to Vself, the moving speed of the entry position candidate 31A, 31B is set to Vtrgt, and the time until the entry position candidate reaches the start point is set to t.

[Eq. 1]

$$v_{trgt} - v_{self} = a_{xref} * t \quad [1]$$

Note that the target speed is the moving speed Vtrgt of the entry position candidate. Next, a lane change timing and a target acceleration in the lateral direction are set (S230). The time tLanechange until the lane change is started can be obtained by the following equation when the distance to the start point is set to Lstart and the margin in the front-rear direction is set to Lmargin.

[Eq. 2]

$$t_{Lanechange} = (L_{start} - L_{margin}) / v_{target} \quad [2]$$

Note that the margin Lmargin in the front-rear direction is set according to the traveling environment such as the road surface condition. Further, for the target acceleration ayref in the lateral direction, a preset value with which the lane change will be completed at the merging completion point is applied according to the time from the start of the lane change until it reaches the merging completion point.

Next, an evaluation value J is calculated for each of the currently selected entry position candidates 31A, 31B (S240). The evaluation value J is represented by a cost function obtained by multiplying an evaluation value xvhcl related to the acceleration and an evaluation value xenv related to the reciprocal of the inter-vehicle distance by constants Wvhcl and Wenv representing predetermined weights.

[Eq. 3]

$$J = x_{vhcl}^T W_{vhcl} x_{vhcl} + x_{env}^T W_{env} x_{env} \quad [3]$$

$$x_{vhcl} = [a_{xref} \, a_{yref}]^T$$

$$\min_x J(x) \; x \in S$$

$$x_{env} = \left[\frac{1}{Lt} \; \ldots \; \right]^T$$

The entry position candidate with which this evaluation value J becomes the smallest in the process described later is to be selected as the optimal entry position. However, upper limits (control conditions) are set for the settable acceleration and reciprocal of the inter-vehicle distance, and even if the evaluation value J becomes the smallest, ones with which the acceleration and the reciprocal of the inter-vehicle distance exceed the upper limits are excluded from the optimum entry position.

Next, it is determined whether or not there are other unselected entry position candidates 31A, 31B (S250). If there are other unselected entry position candidates 31A, 31B (S250: YES), one of the unselected other entry position candidates 31A, 31B is selected (S260) and the process returns to S220.

If there is no other unselected entry position candidate 31A, 31B (S250: NO), the entry position candidate 31A, 31B having the smallest evaluation value J is selected as the optimum entry position (S310). For example, as shown in FIG. 7, the entry position candidate 31A is set as the optimal entry position. Next, the control pattern of the own vehicle is set according to the acceleration, the control timing, and the like obtained for the optimum entry position, and a command for performing this control pattern is outputted to the vehicle control actuator 27 (S320).

Figure 8A:
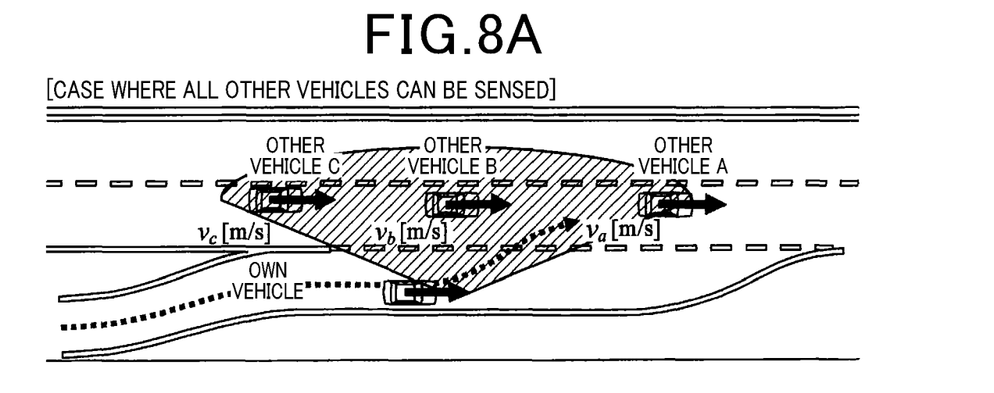
FIG. 8A A plan view showing an example of a positional relationship of the own vehicle and other vehicles (part 1).
Figure 9A:
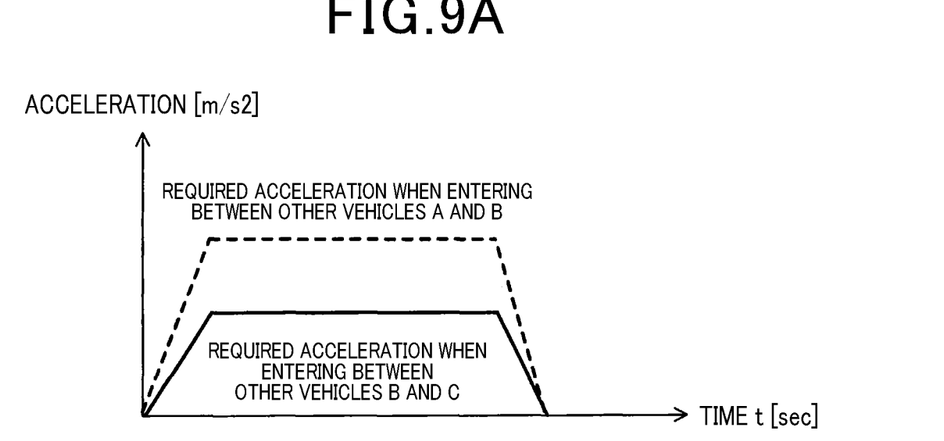
FIG. 9A A map showing an example of a control pattern in a front-rear direction (part 1).
Figure 10:
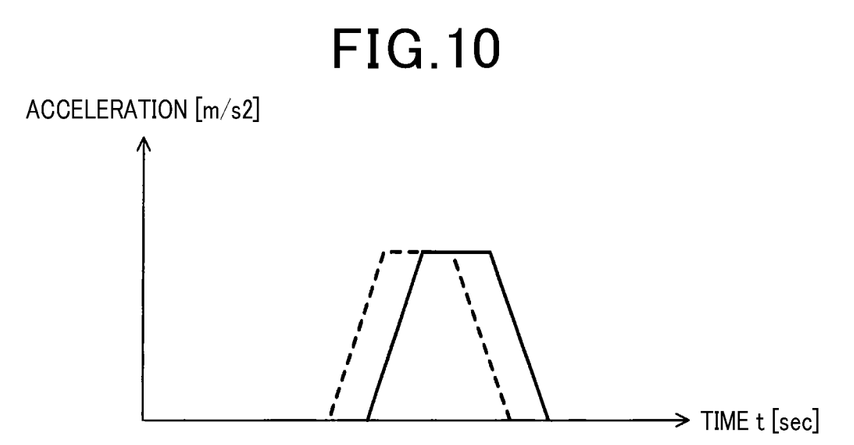
FIG. 10 A map showing an example of the control pattern in a lateral direction.

In this process, for example, as shown in FIG. 8A, when other vehicles A, B, and C are traveling on the lane after the lane change, for example, a control pattern as shown in FIG. 9A and FIG. 10 is set.

That is, regarding the control pattern in the front-rear direction, for example, when performing lane changing between the other vehicle B and the other vehicle C, the own vehicle is first accelerated at a certain increase rate of acceleration, and then the acceleration is kept constant, and after that the acceleration is reduced at a certain decrease rate of acceleration to end the acceleration of the vehicle as indicated by the solid line in FIG. 9A. When the acceleration of the own vehicle has ended, the vehicle reaches the start point of the merging area.

Note that, for example, when the lane change is performed to enter between the other vehicle A and the other vehicle B, as indicated by the broken line in FIG. 9A, the increase rate of the acceleration, the upper limit of the acceleration, and the decrease rate of the acceleration are all set greater compared with when the lane change is performed to enter between the other vehicle B and the other vehicle C.

On the other hand, with regard to the acceleration in the lateral direction, in principle, it is set so that the lane change is performed after the acceleration of the own vehicle has ended. That is, the acceleration in the lateral direction is set with reference to the control pattern related with the front-rear direction.

When the lane change is performed between the other vehicle B and the other vehicle C, for example, a control pattern as indicated by the solid line in FIG. 10 is generated. That is, regarding the acceleration in the lateral direction, similarly to the acceleration in the front-rear direction, the own vehicle is first moved laterally at a certain increase rate of acceleration, and then the acceleration is kept constant, and after that the acceleration is reduced at a certain decrease rate of acceleration to end the lane change of the own vehicle.

Note that when the lane change is performed between the other vehicle A and the other vehicle B, for example, since the time to the end of the acceleration of the own vehicle becomes shorter, as indicated by the broken line in FIG. 10, the lane change is started earlier than when the lane change is performed between the other vehicle B and the other vehicle C.

Further, in the example shown in FIG. 10, since the road on which the own vehicle travels is one-dimensionalized, the acceleration in the lateral direction according to the shape of the road on which the own vehicle travels is also calculated separately from the acceleration for the lane change and is superimposed on the acceleration in the lateral direction.

Next, it is determined whether the lane change has finished (S330). If the lane change has not finished (S330: NO), the process returns to S110. That is, the sensing of other vehicles and the generation of a control pattern are repeated until the lane change is finished. On the other hand, if the lane change has been finished (S330: YES), the merging support process is terminated.

Figure 8B:
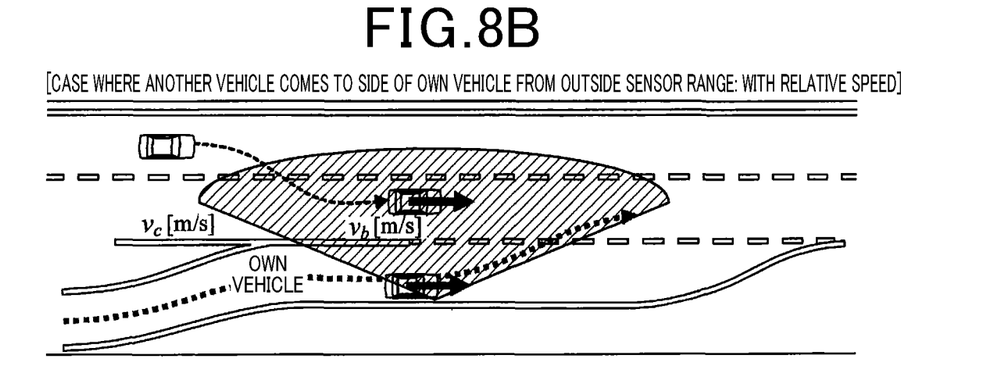
FIG. 8B A plan view showing an example of the positional relationship of the own vehicle and other vehicles (part 2).
Figure 8C:
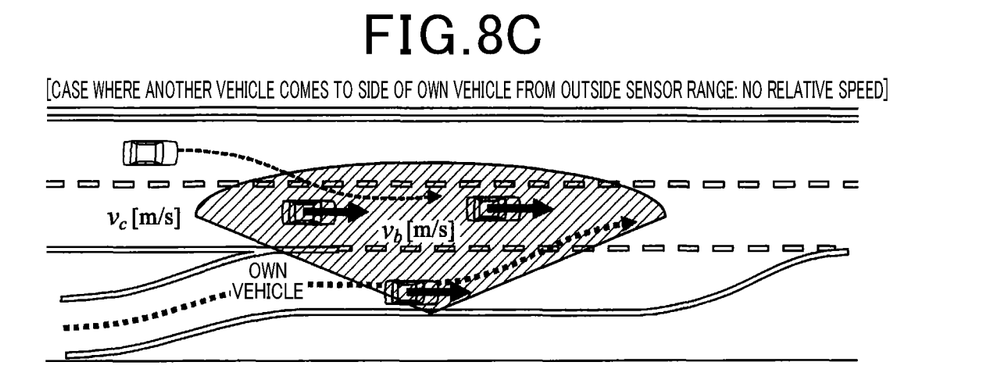
FIG. 8C A plan view showing an example of the positional relationship of the own vehicle and other vehicles (part 3).

In the merging support process of the present embodiment, since sensing of other vehicles and generation of a control pattern are repeated until the lane change is completed as described above, it is possible to preferably cope with a situation where a new other vehicle that could not be detected by the camera unit 21 and the inter-communication device 26 suddenly became detectable as shown in FIGS. 8B and 8C.

Figure 9B:
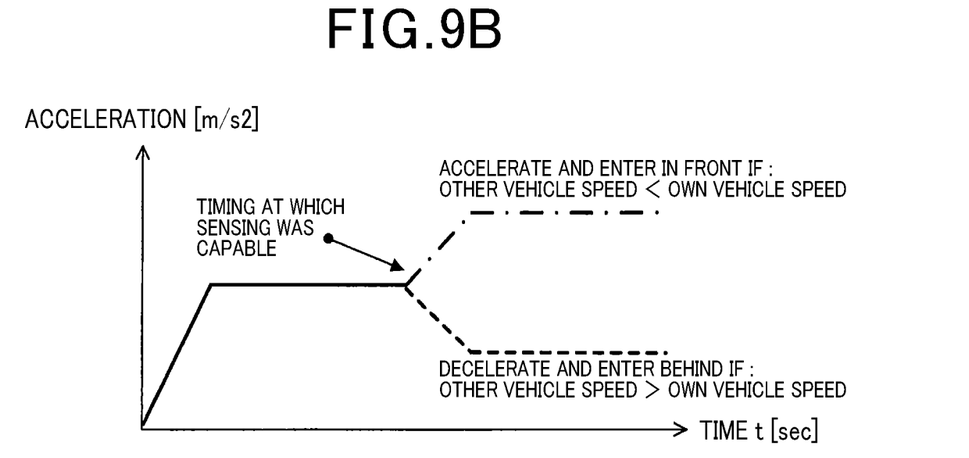
FIG. 9B A map showing an example of the control pattern in the front-rear direction (part 2).

In particular, as shown in FIG. 8B, when a new other vehicle is detected just beside the own vehicle, as shown in FIG. 9B, this new other vehicle's speed is compared with the own vehicle's speed, and when the other vehicle's speed is slower than the own vehicle's speed, for example, the control pattern is generated such that the own vehicle further accelerates and changes lanes in front of the other vehicle.

Further, when the speed of the other vehicle is faster than the speed of the own vehicle, for example, the control pattern is generated such that the acceleration of the own vehicle is slowed down and the lane change is made behind the other vehicle. Note that the manner of slowing down the acceleration includes decelerating the own vehicle.

That is, it is possible to improve the ride comfort and safety by controlling the own vehicle such that the acceleration upon the lane change is small.

Figure 9C:
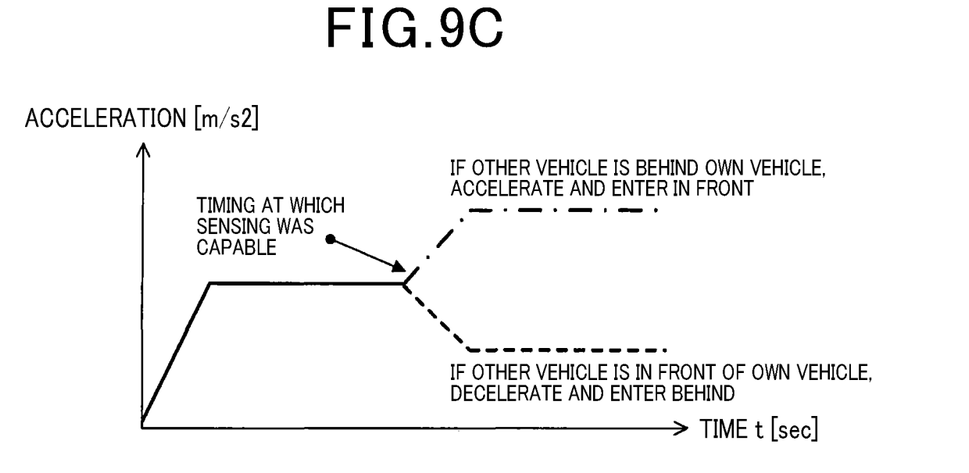
FIG. 9C A map showing an example of the control pattern in the front-rear direction (part 3).

Further, as shown in FIG. 8C, when a new other vehicle having a small relative speed is detected at one side of and in front of or behind the own vehicle, whether the own vehicle should be accelerated or decelerated is determined according to the position of the new other vehicle as shown in FIG. 9C. For example, when the other vehicle is positioned behind the own vehicle, the control pattern is generated such that the own vehicle accelerates and changes lanes in front of the other vehicle.

Further, when the other vehicle is positioned ahead of the own vehicle, for example, the control pattern is generated such that the acceleration of the own vehicle is slowed down and the lane change is made behind the other vehicle.

[Effects of the Present Embodiment]

In the above-described vehicle control system 1, the control unit 10 estimates, based on the movement of other vehicles traveling on the lane to which the course is to be changed, the movement in the target area (the entry position candidate) representing an area where no other vehicle is traveling on the lane in the future (S190). Further, the control unit 10 sets a control pattern which represents control amounts of the own vehicle in time series that are required in order to make the movement of the target area and the movement of the own vehicle match (S220, S230, S310, S320). Then, the control unit 10 controls the motion of the own vehicle according to the set control pattern (S320).

According to the vehicle control system 1, the motion in the target area where no other vehicle exists is estimated, and the own vehicle is controlled so that the motion of the own vehicle matches with this motion. Thus, it is possible to appropriately carry out the control for moving the own vehicle to the course to which its course is to be changed.

In the above-described vehicle control system 1, the control unit 10 estimates the motions of a plurality of target areas and calculates a control pattern of the own vehicle for each of the motions of the target areas. Further, the control unit 10 selects a control pattern that satisfies preset control requirements from the calculated control patterns and sets the selected control pattern as the control pattern for the own vehicle.

According to such vehicle control system 1, since one that satisfies the control conditions it selected and adopted for the motions of a plurality of target areas, optimum control can be performed taking safety and vehicle characteristics into account.

In the above-described vehicle control system 1, the control unit 10 calculates, for each calculated control pattern, an evaluation value by adding a value based on the reciprocal of the magnitude of the inter-vehicle distance with another vehicle and a value based on the magnitude of the acceleration included in the control pattern, and the control pattern that minimizes the evaluation value is selected as the control pattern satisfying the control conditions.

According to such vehicle control system 1, since the control pattern that minimizes the evaluation value which takes the inter-vehicle distance and the acceleration into account is adopted, it is possible to satisfy both the safety and the ride comfort.

In the above-described vehicle control system 1, the control unit 10 obtains a start point distance representing the distance to the start point of an area where the own vehicle can change its lane to the course change destination lane, and an end point distance representing the distance to the end point of the area where the lane change is possible. Further, the control unit 10 sets a control pattern which indicates control amounts of the own vehicle in time series that are required in order to make the movement of the target area and the movement of the own vehicle match, and which makes the lane change complete after the own vehicle has traveled the start point distance and before it travels the end point distance.

According to such vehicle control system 1, even when the area where the own vehicle can change its lane to the course change destination lane is limited (that is, for example, when the lane on which the own vehicle is currently traveling disappears due to merging or the like), the vehicle control can be carried out appropriately.

In the above-described vehicle control system 1, the control unit 10 sets a control pattern that completes the lane change when the vehicle has traveled the end point distance.

According to such vehicle control system 1, since the lane change is made using the maximum distance when the area where the lane change is possible is limited, the lane change is performed using the maximum distance, and thus a good margin can be secured for the control.

In the above-described vehicle control system 1, when there is another vehicle traveling in the course change destination lane within a preset reference distance from the own vehicle, the control unit 10 sets a control pattern that completes the lane change when the own vehicle has traveled the end point distance, and when another vehicle does not exist within the reference distance from the own vehicle, the control unit 10 sets a control pattern that completes the lane change before the own vehicle travels the end point distance.

According to such vehicle control system 1, when another vehicle does not exist within the reference distance, the lane change is completed earlier. Thus, it is possible to release the driver of the own vehicle from the tension upon the lane change earlier.

In the above-described vehicle control system 1, the control unit 10 sets a control pattern using a one-dimensionalized model in which the motion of the target area and the motion of the own vehicle are one-dimensionalized.

According to such vehicle control system 1, simplification thereof is achieved by one-dimensionalizing the motion of the target area and the motion of the own vehicle. Thus, it is possible to obtain the control pattern (in particular, the control amounts related to acceleration/deceleration) of the own vehicle through a simple calculation.

In the above-described vehicle control system 1, the control unit 10 repeatedly performs the process of obtaining the control pattern of the own vehicle.

According to such vehicle control system 1, the own vehicle can be controlled in response to a change in the speed of another vehicle or in response to another vehicle that has newly appeared.

Other Embodiments

The present disclosure is not to be construed as being limited in any way by the above-described embodiment. The function of one constituent element in the above embodiment may be distributed to a plurality of constituent elements, or the functions of a plurality of constituent elements may be integrated into one constituent element. Further, a part of the configuration of the above embodiment may be omitted as long as the problems can be solved. Furthermore, at least a part of the configuration of the above embodiment may be added or substituted in the configuration of the other embodiments described above. The embodiments of the present disclosure include any mode included in the technical ideas specified by the language of the claims.

In addition to the above-described vehicle control system 1, the present disclosure may be realized in various forms such as a device constituting a part of the vehicle control system 1, a program for causing a computer to function as the vehicle control system, a medium storing the program, and a method for controlling a vehicle.

For example, in the above-described embodiment, an example is shown where the own vehicle is supported when it merges to another lane, but it is applicable not only to merging but also to a lane change. Since the lane on which the own vehicle travels will not disappear in a case of the lane change, an area similar to the merging area can be set at an arbitrary position ahead of the own vehicle.

Further, although the own vehicle is controlled in the lateral direction after the control of the own vehicle in the front-rear direction has completed in the above-described embodiment, the control of the own vehicle in the lateral direction may be started before the control in the front-rear direction of the own vehicle is completed.

Even when such modifications are made, generally the same effects as those provided by the above embodiment can be provided.

[Correspondence Between the Configuration of the Embodiment and the Means of the Present Disclosure]

Of the processes executed by the control unit 10 in the above embodiment, the process of S130 corresponds to a start point-end point distance acquisition unit in the present disclosure, and the process of S190 in the above embodiment corresponds to a target motion estimation unit in the present disclosure. In addition, the processes in S220, S230, S310, and S320 in the above embodiment correspond to a control pattern setting unit in the present disclosure, and the processes in S220 and S230 in the above embodiment correspond to a control pattern computing unit in the present disclosure.

Further, the process in S310 in the above embodiment corresponds to a control pattern selection unit in the present disclosure, and the process in S320 in the above embodiment corresponds to a selection setting unit and a motion control unit in the present disclosure.

Furthermore, the process in S330 in the above embodiment corresponds to a repeating unit in the present disclosure.

The invention claimed is:

1. A vehicle control device mountable on an own vehicle and configured to control motion of the own vehicle, the vehicle control device comprising:
    a target motion estimation unit configured to search for, based on a motion of another vehicle traveling on a lane to which the own vehicle is to be changed, a target area on the lane, the target area where no other vehicle is traveling on the lane in the future, and estimate a motion of the target area based on the motion of the another vehicle;
    a control amount setting unit configured to set, based on the motion of the target area, a target control amount which the own vehicle requires for merging to the target area; and
    a motion control unit configured to control the motion of the own vehicle according to the set target control amount.

2. The vehicle control device according to claim 1, wherein
    the target motion estimation unit is configured to estimate motions of a plurality of target areas, and
    the control amount setting unit further includes:
        a control amount calculation unit configured to calculate the target control amount for each of the motions of the plurality of target areas, a control amount selection unit configured to select a target control amount that satisfies a preset control condition from the calculated target control amounts, and a selection setting unit configured to set the selected target control amount as a target control amount used by the motion control unit to control the own vehicle.

3. The vehicle control device according to claim 2, wherein the control amount selection unit calculates, for each of the calculated target control amounts, an evaluation value based on an inter-vehicle distance with the other vehicle and a magnitude of acceleration included in each target control amount, and selects the target control based on the evaluation value.

4. The vehicle control device according to claim 1, further comprising:

a start point-end point distance acquisition unit configured to obtain a start point distance representing the distance from the own vehicle to a start point of an area where the own vehicle can change its lane to the lane to which the course is to be changed, and an end point distance representing the distance from the own vehicle to an end point of the area where a lane change is possible, wherein the control amount setting unit sets the target control amount that enables the own vehicle to complete the lane change after the own vehicle has traveled the start point distance and before the own vehicle travels the end point distance.

5. The vehicle control device according to claim 4, wherein the control amount setting unit sets the target control amount that enables the own vehicle to complete the lane change based on the own vehicle traveling the end point distance.

6. The vehicle control device according to claim 5, wherein the control amount setting unit sets the control amount that enables the own vehicle to complete the lane change based on the own vehicle traveling the end point distance when there is another vehicle traveling on the lane to which the course is to be changed within a preset reference distance from the own vehicle, and sets a target control amount that completes the lane change before the own vehicle travels the end point distance based on no other vehicle existing within the reference distance from the own vehicle.

7. The vehicle control device according to claim 1, wherein the control amount setting unit sets the target control amount in a one-dimensionalized model in which the motion of the target area and the motion of the own vehicle are one-dimensionalized.

8. The vehicle control device according to claim 1, further comprising a repeating unit configured to cause the target motion estimation unit, the control amount setting unit, and the motion control unit to repeat their operations.

9. The vehicle control device according to claim 1, wherein the target motion estimation unit is configured to set the target control amount such that the motion of the own vehicle matches the motion of the target area based on a lane change being completed.

10. The vehicle control device according to claim 1, wherein the target control amount includes a target velocity and a target acceleration.

11. The vehicle control device according to claim 10, wherein the target motion estimation unit is configured to estimate a velocity of the target area which is an average velocity between a velocity of a car which travels front-side of the target area and a velocity of a car which travels back-side of the target area.

12. The vehicle control device according to claim 10, wherein the target motion estimation unit is configured to estimate a velocity of the target area which is a velocity of a car which travels front-side of the target area or a velocity of a car which travels back-side of the target area.

13. The vehicle control device according to claim 3, wherein the control amount selection unit calculates, for each of the calculated target control amounts, the evaluation value by adding a value based on a reciprocal of a magnitude of the inter-vehicle distance with the other vehicle and a value based on the magnitude of acceleration included in each target control amount.

14. The vehicle control device according to claim 3, wherein the control amount selection unit selects one of the target control amounts whose evaluation value is a minimum from the evaluation values calculated by the control amount selection unit.

15. A method comprising:

searching for, based on a motion of another vehicle traveling on a lane to which an own vehicle is to be changed, a target area on the lane, the target area where no other vehicle is traveling on the lane in the future;

estimating a motion of the target area based on the motion of the another vehicle;

setting, based on the motion of the target area, a target control amount which the own vehicle requires for merging to the target area; and controlling the motion of the own vehicle according to the set target control amount.

16. A non-transitory computer readable medium having stored therein instructions, that when executed by a computing device, cause the computing device to perform functions, the functions comprising:

searching for, based on a motion of another vehicle traveling on a lane to which an own vehicle is to be changed, a target area on the lane, the target area where no other vehicle is traveling on the lane in the future;

estimating a motion of the target area based on the motion of the another vehicle;

setting, based on the motion of the target area, a target control amount which the own vehicle requires for merging to the target area; and controlling the motion of the own vehicle according to the set target control amount.

* * * * *